(12) United States Patent
Schoell

(10) Patent No.: US 8,266,846 B2
(45) Date of Patent: Sep. 18, 2012

(54) SOLAR PANEL ROOF SURFACE

(75) Inventor: George Schoell, Richmond Hill (CA)

(73) Assignee: Ontario Inc., Aurora, ON (CA)

( * ) Notice: Subject to any disclaimer, the term of this patent is extended or adjusted under 35 U.S.C. 154(b) by 120 days.

(21) Appl. No.: 12/662,873

(22) Filed: May 7, 2010

(65) Prior Publication Data
US 2010/0313506 A1    Dec. 16, 2010

(51) Int. Cl.
*E04D 13/18*   (2006.01)
*E04D 1/30*    (2006.01)

(52) U.S. Cl. ........ 52/173.3; 52/176; 52/302.3; 126/623; 126/621

(58) Field of Classification Search .............. 52/173.3, 52/171.1, 200, 302.3, 202, 176; 126/704, 126/623, 621; 136/244, 252, 251
See application file for complete search history.

(56) References Cited

U.S. PATENT DOCUMENTS

| | | | | |
|---|---|---|---|---|
| 5,794,386 A * | 8/1998 | Klein | ............. | 52/91.1 |
| 6,799,398 B1 * | 10/2004 | Plevyak | ............. | 52/173.3 |
| 7,915,519 B2 * | 3/2011 | Kobayashi | ............. | 136/251 |
| 2008/0302407 A1 * | 12/2008 | Kobayashi | ............. | 136/251 |

FOREIGN PATENT DOCUMENTS

JP    57155052 A  *  9/1982

* cited by examiner

*Primary Examiner* — Phi Dieu Tran A

(57) ABSTRACT

A solar panel roof surface effectively uses solar panels supported by an open roof support substructure having a series of parallel hollow support beams. These hollow beams support the solar panels on a top surface and accommodate drainage along the beams. The solar panels are secured to an upper surface of the hollow support beams and in combination therewith define a closed sloped roof surface. The series of solar panels are positioned on the beams to define elongate segments of abutting panels. The abutting panels include a sealing arrangement between panels to allow flow of water along the length of the elongate segments. The hollow support beams include a top surface with a central securing slot positioned between panel segments and panel segment support surfaces either side of said securing slot for supporting edges of the solar panels. Fasteners engage the securing slot and the upper edge of the panels to secure the panels to the upper surface of the support beams.

7 Claims, 13 Drawing Sheets

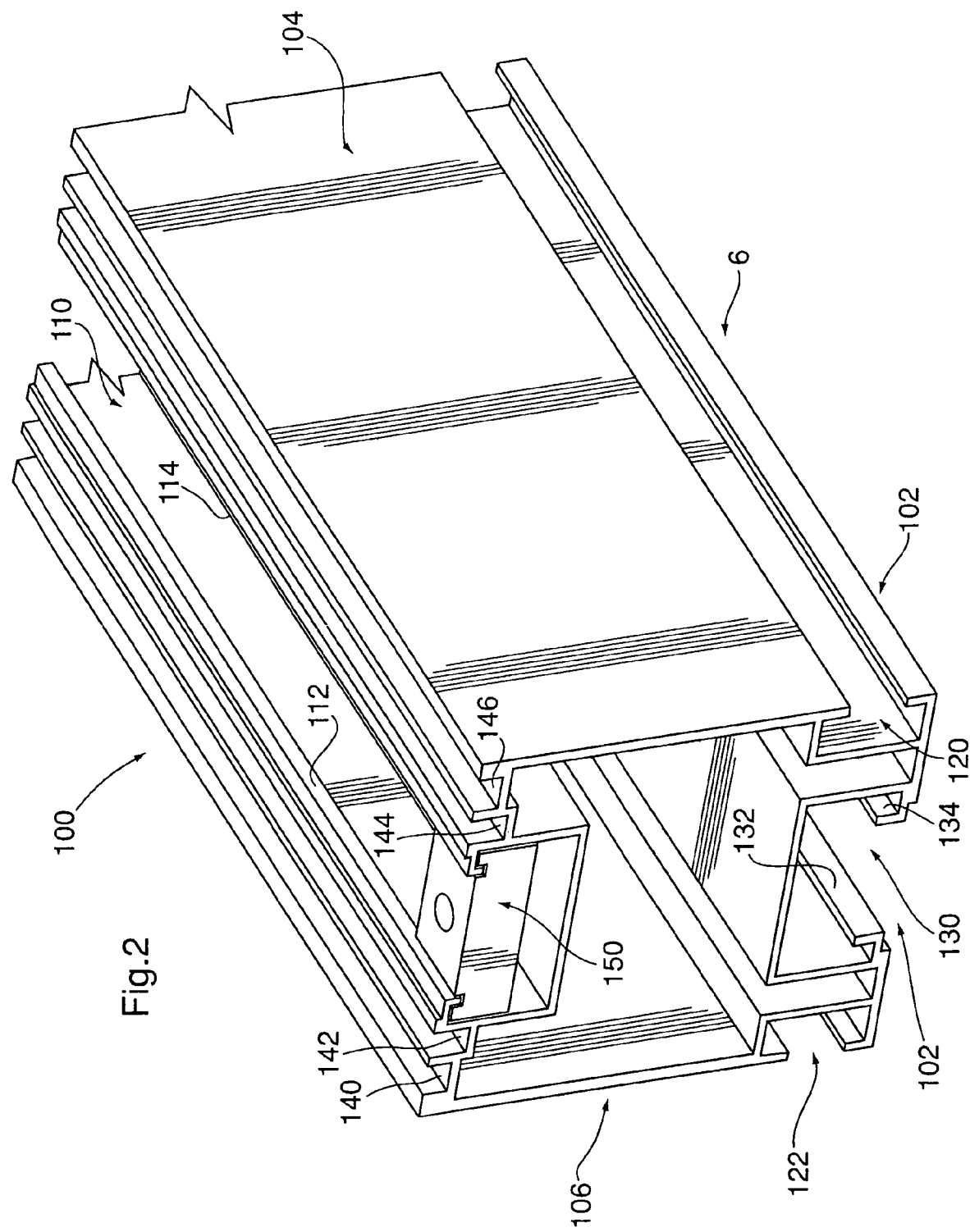

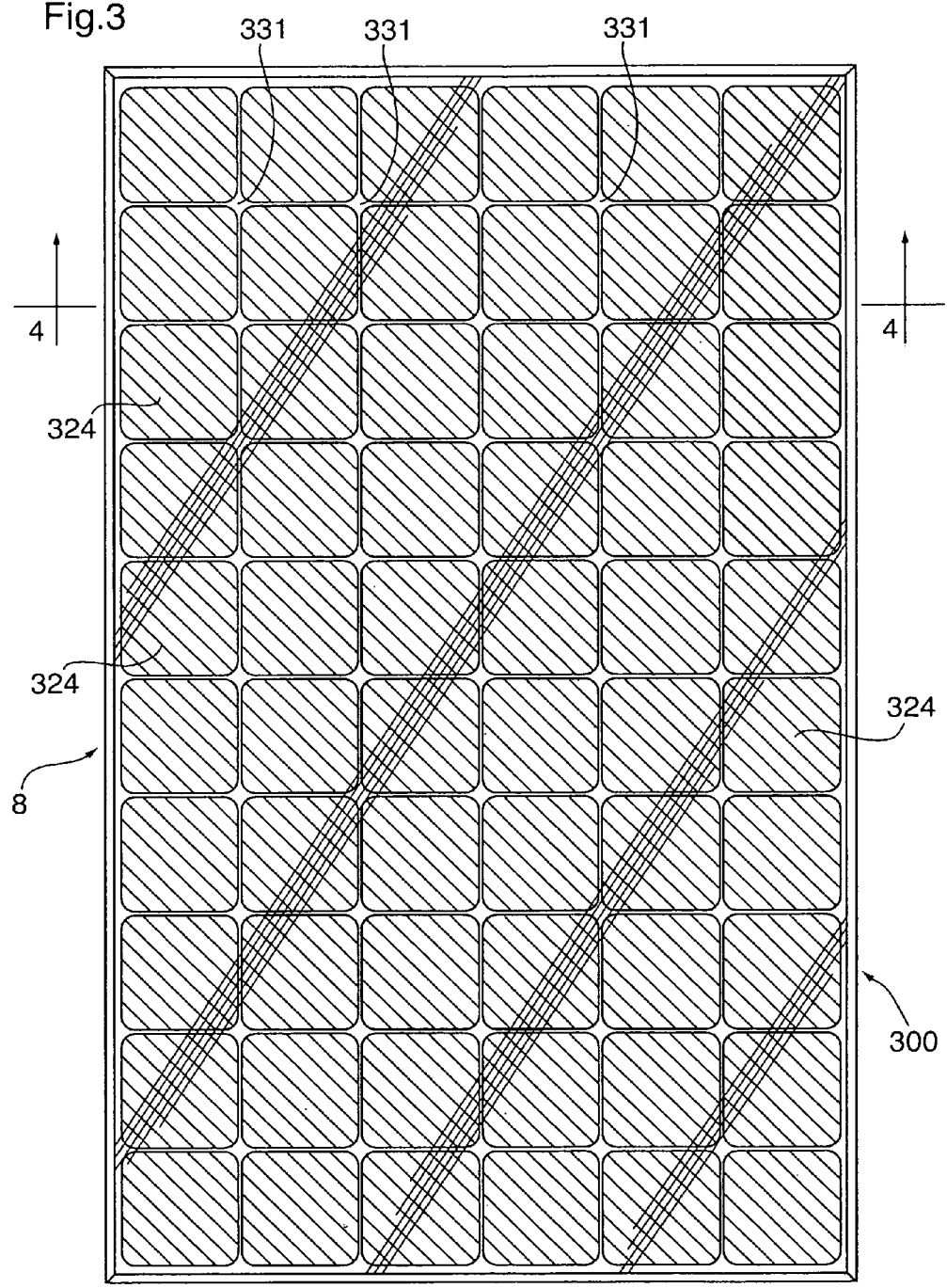

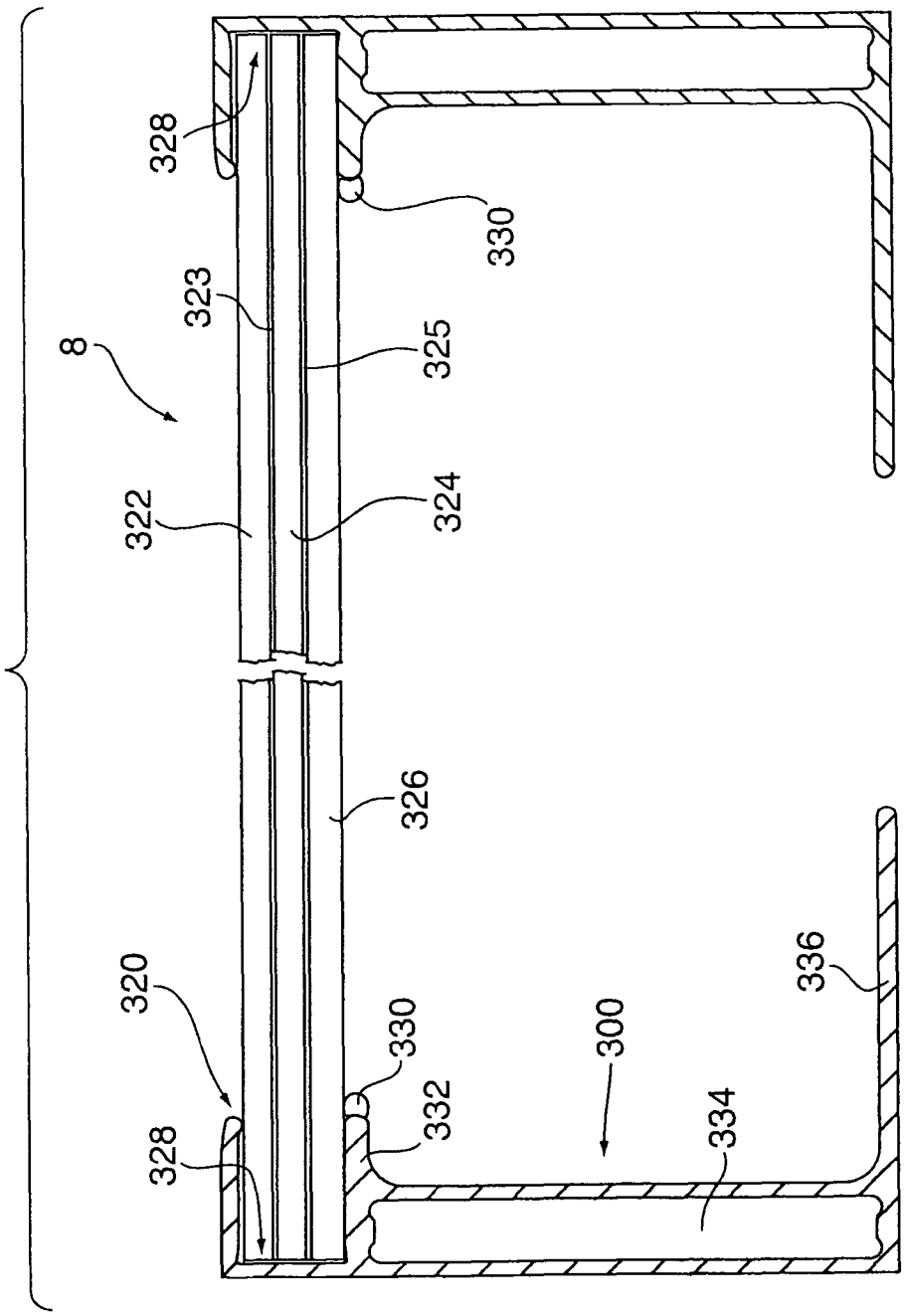

US 8,266,846 B2

SOLAR PANEL ROOF SURFACE

FIELD OF THE INVENTION

The present invention relates to solar panel roof surfaces, and in particular to a roof system where the solar panels cooperate with the roof support substructure to define in combination a closed sloped roof surface. In contrast to roof mounted solar panel systems, the solar panels of the present system form part of the actual roof structure.

BACKGROUND OF THE INVENTION

Solar panel systems are primarily arranged on existing roof surfaces that are oriented to the south and slanted or sloped. The actual solar panels are mounted on beams that overly an existing roof covering. The solar panel systems do not provide a roof cover that fulfills the function of protecting against the wind and directing rain and other moisture off the roof.

The solar panel roof surface of the present invention is defined by a roof support substructure essentially comprising support beams with solar panels attached to the support beams and providing the actual roof functionality. With this arrangement, the substantial cost of the solar panels is partially deferred due to their dual function of providing a roof cover and power generation. The solar panel roof surface system as described in the present application is primarily for use in association with south facing sloped roofs.

SUMMARY OF THE INVENTION

A solar panel roof surface according to the present invention comprises a roof support substructure having a series of parallel hollow support beams extending downwardly from a roof peak to a roof edge. A series of solar panels are secured to the series of hollow parallel support beams and collectively define a closed sloped roof surface. The series of solar panels are positioned and supported to define elongate segments or strips of abutting panels where each elongate segment is one panel wide and supported between adjacent hollow support beams. The abutting panels of an elongate segment include a sealing arrangement between the panels to allow water to flow over adjacent panels and along the length of the elongate segment. The series of hollow support beams include a top surface including a central securing slot positioned between elongate segments of panels, and panel segment support surfaces either side of the securing slot for supporting edges of adjacent solar panels. At least one drainage channel is provided in the top surface and extends the length of the support beam for draining of water received in the channel to the roof edge.

According to an aspect of the invention the top surface of each hollow support beam includes two shallow elongate drainage channels positioned either side of the securing slot.

In yet a further aspect of the invention each drainage channel is a depth less than half the depth of the central securing slot.

In yet a further aspect of the invention each hollow support beam includes two elongate gasket-receiving slots parallel to and on opposite sides of the two shallow elongate drainage channels.

In yet a further aspect of the invention each panel includes a frame that, along opposed edges, is supported by adjacent hollow beams with each opposed edge overlapping with one of the drainage channels and extending to or partially into securing channels of the adjacent hollow beams.

In yet a further aspect of the invention each panel frame includes an inwardly extending bottom peripheral flange with drainage holes provided in the flange adjacent corners of the panels. The drainage holes are located above the drainage channels of the adjacent hollow beams when the panels are secured.

In yet a further aspect of the invention the solar panels each accommodate about 5% light transmission of available light through the panels.

BRIEF DESCRIPTION OF THE DRAWINGS

Preferred embodiments of the invention are shown in the drawings, wherein:

FIG. 2 is a partial perspective view illustrating the cross section of the parallel hollow support beams;

FIG. 3 is a top view of a solar panel;

FIG. 4 is a sectional view taken along lines 4-4 of FIG. 3;

DETAILED DESCRIPTION OF THE PREFERRED EMBODIMENTS

Figure 1A:
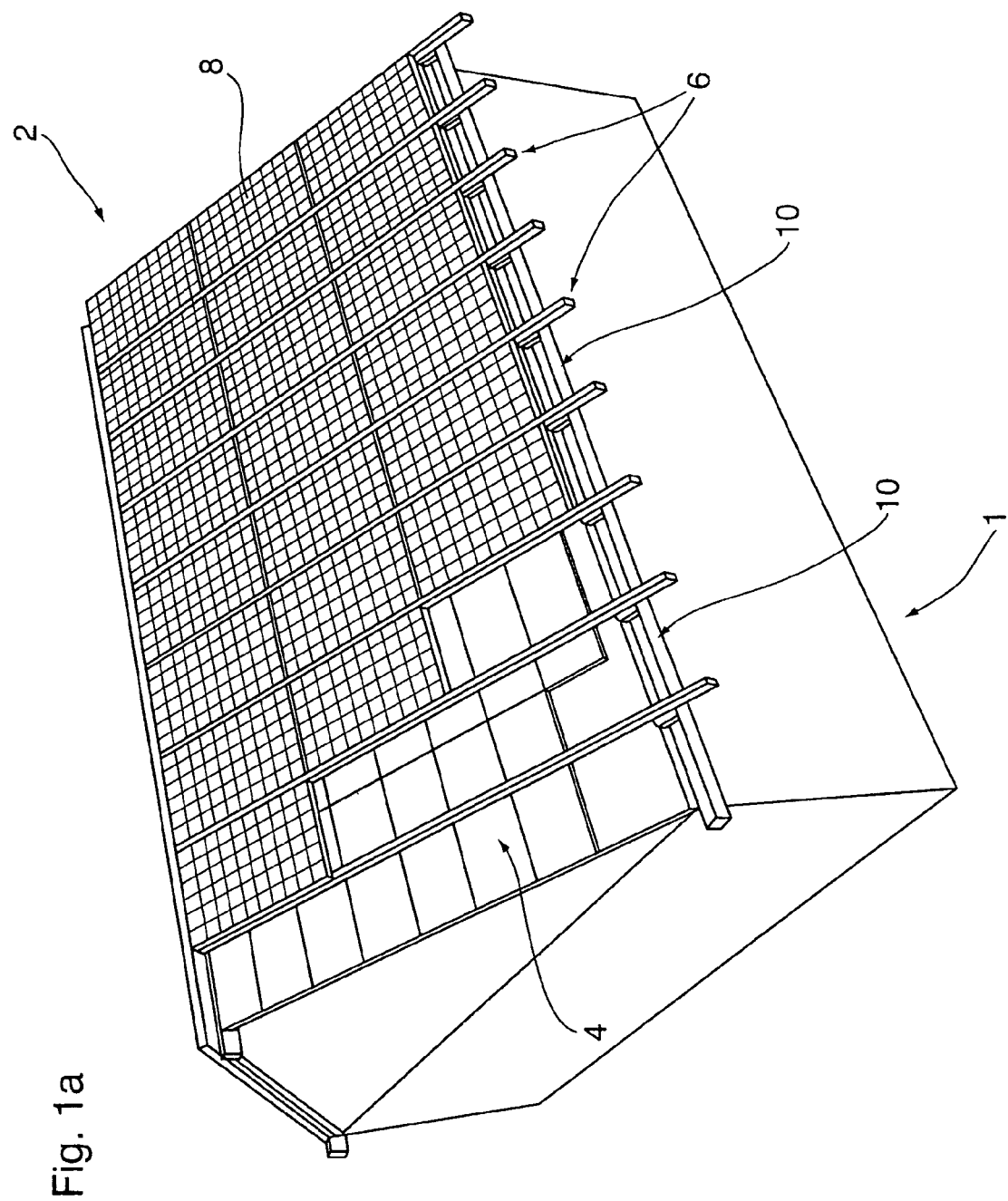
FIG. 1a is a schematic showing a building with a solar panel system.

FIG. 1a is a schematic showing a building 1 with a solar panel roof surface 2 that in the northern hemisphere is generally south facing. The solar panel roof surface is supported by roof substructure 4 that includes a series of parallel hollow support beams 6. A series of solar panels 8 are supported above the roof support substructure 4 and these panels receive solar radiation and produce electrical power. As shown in FIG. 1a, the individual solar panels 8 are each supported between a pair of adjacent parallel hollow support beams 6 and the panels are placed in end to end abutment to form elongate segments of abutting panels shown as 10.

Figure 1B:
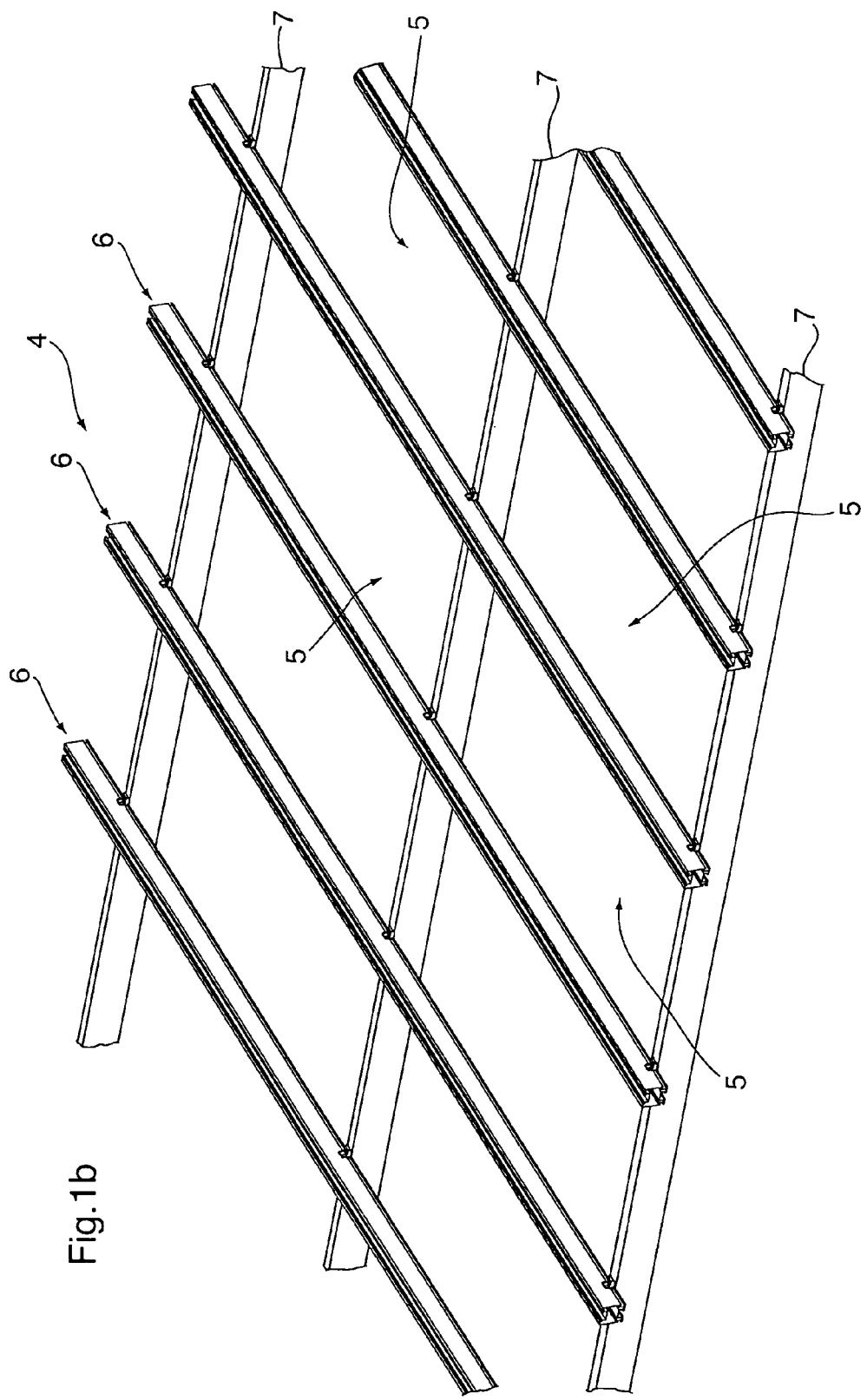
FIG. 1b is a partial perspective view of the roof support substructure for receiving and supporting solar panels.
Figure 5:
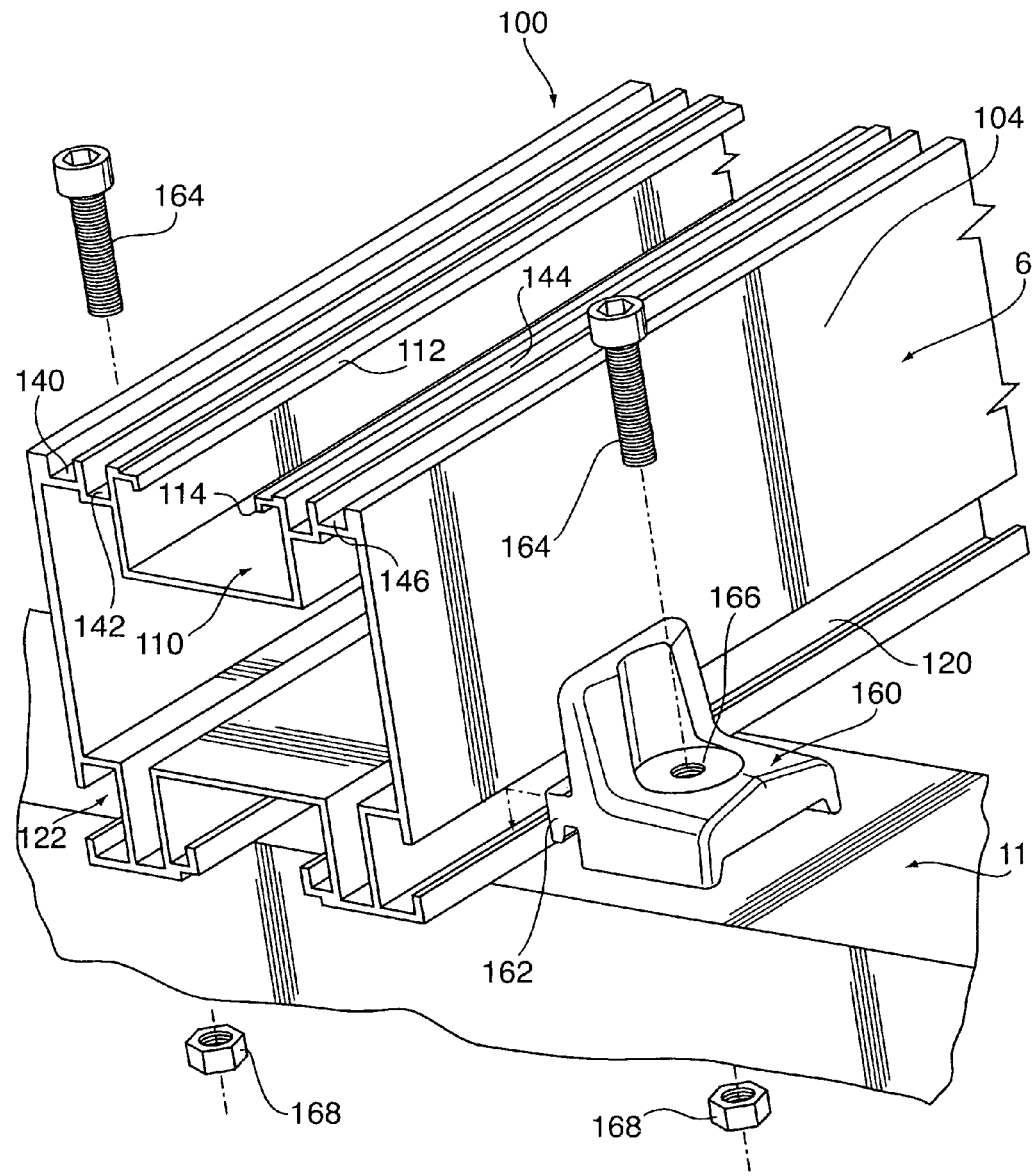
FIG. 5 is a partial perspective view showing an arrangement for mounting of the hollow support beams to an underlying truss.

Additional details of the roof support substructure 4 are shown in FIG. 1b, FIG. 2 and FIG. 5. The series of parallel hollow support beams 6 are immediately below the solar panels and provide the direct support for the panels. The series of parallel hollow support beams 6 can be supported by a series of appropriate joists 7 as shown in FIG. 1b or these beams may be supported between roof trusses or form part of a roof truss. In contrast to other solar panel systems, the solar panels 8 are part of the actual roof system and protect the interior of the building from the weather. Therefore, the open cells 5 shown in FIG. 1b in the preferred embodiment remain open and these are essentially closed by the elongate panel segments 10 of abutting solar panels.

The series of hollow support beams 6 are designed to support the solar panels and to simplify assembly of the solar panels to the hollow support beams 6. The solar panels and the beams provide drainage over the roof structure by directing moisture and water on the roof surface to the lower roof edge.

Details of the structure of the hollow support beams 6 are shown in FIG. 2. The hollow support beams 6 include a top surface 100, a bottom surface 102 and opposed side surfaces 104 and 106. The top surface 100 includes a central securing slot 110 having a pair of inwardly and downwardly directing stub flanges 112 and 114 for capturing a securing member such as the slidable block 150 in the central securing slot 110. A number of different securing members can be placed along the length of the central securing slot 110 for securing of the solar panels to these beams. Typically each side of a panel is secured by two or more securing members.

The central securing slot 110, either side thereof, includes drain channels 142 and 144. These drain channels in the top surface 100 cooperate with the edges of the solar panels to drain moisture (condensation) that may collect on the interior surface of the panels into the drain channels and subsequently to the outer edge of the roof. At outer edges of the top surface 100 are sealing gasket grooves 140 and 146. Each of these sealing gasket grooves receives a gasket that seals with a lower surface of the panel frame. The gasket seals the panel along the length of the hollow support beam.

The hollow support beam 6 is typically of an extruded aluminum or extruded aluminum alloy, and the side surfaces 104 and 106 each include, at a lower edge thereof, outwardly opening securing slots 120 and 122. These securing slots are used to conveniently fasten the hollow support beam 6 to an underlying support structure. Basically these securing slots simplify the assembly of the roof substructure and the attachment of the hollow beams to the underlying structure.

The bottom surface 102 of the hollow support beams 6 includes a downwardly opening central securing slot 130 that has on either side thereof inwardly and upwardly extending stub flanges 132 and 134. These stub flanges essentially partially close the bottom surface of the securing slot and allow for easy containment of securing members in a manner similar to the securing slot 110. In the assembled structure, this downwardly opening securing slot 130 can be used to attach other elements to the roof structure and can be used to secure the hollow support beam 6 to an underlying structure if required. The hollow support beam 6 preferably has a symmetrical cross section with respect to a vertical axis simplifying installation.

The perspective view of FIG. 5 illustrates securement of the hollow support beam 6 to an underlying horizontal support member 11. Preferably the hollow support beam 6 is secured using a cast or extruded foot 160 having an outwardly and downwardly projecting securing flange 162. This securing flange 162 is received in the outwardly opening securing slot 120 provided in the side surface 104. A suitable securing member such as the bolt 164 can pass through the port 166 provided in the foot and through the underlying support 11, and will be fastened beneath the support by the nut 168. This provides an efficient fastening of the hollow support beams 6 to an underlying structure and allows the slide engagement of the foot 160 to an appropriate position for fastening. Other fastening arrangements can be used in combination with the securing slots 120 for securing the hollow support beams.

Figure 6:
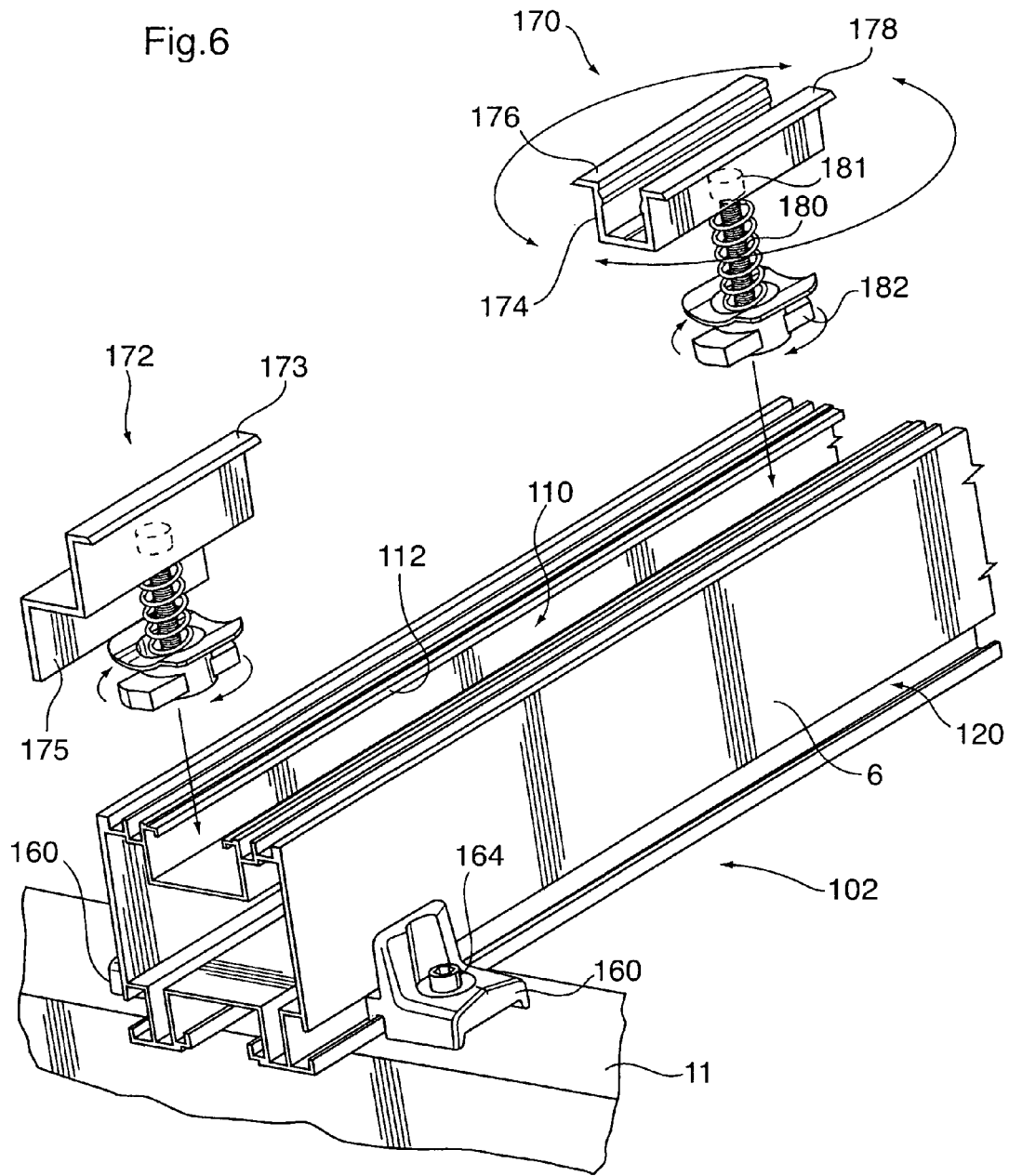
FIG. 6 is a partial perspective view showing securement connectors that are received within the hollow support beams for securing of panels.

In a perspective view of FIG. 6, the hollow support beam 6 is secured to the underlying support beam 11 by the foot 160 and the securing bolt 164. The opposite edge of the hollow support beam 6 is also secured by a similar foot member.

In order to simplify the securement of the solar panels to the top surface 100 of the hollow support beams 6, two-way connectors 170 and one-way connectors 172 are used. The two-way connectors 170 include a U-shaped channel 174 having outwardly extending flanges 176 and 178. The U-shaped member includes a bolt member 180 with a head 181 retained in the U-shaped channel. The bolt member includes a fastening head 182 which in the orientation shown in FIG. 6 can pass into the central securing slot 110 and is movable 90 degrees for retention in the slot. The width of the U-shaped channel generally corresponds to the spacing between adjacent panels as shown in FIG. 8.

The one-way fastener 172 is similar to fastener 170 but only includes a single outwardly extending flange 173. This fastener 172 is used for securing one edge of a solar panel (for example the end solar panels that are secured to an underlying hollow support beam 6). The one-way connector 172 includes a downwardly extending flange 175 that spaces the panel to one side of the securing channel 110. As shown in FIG. 8, this one way connector 172 can also be used to provide an end stop at the edge of the roof system if required.

Figure 8:
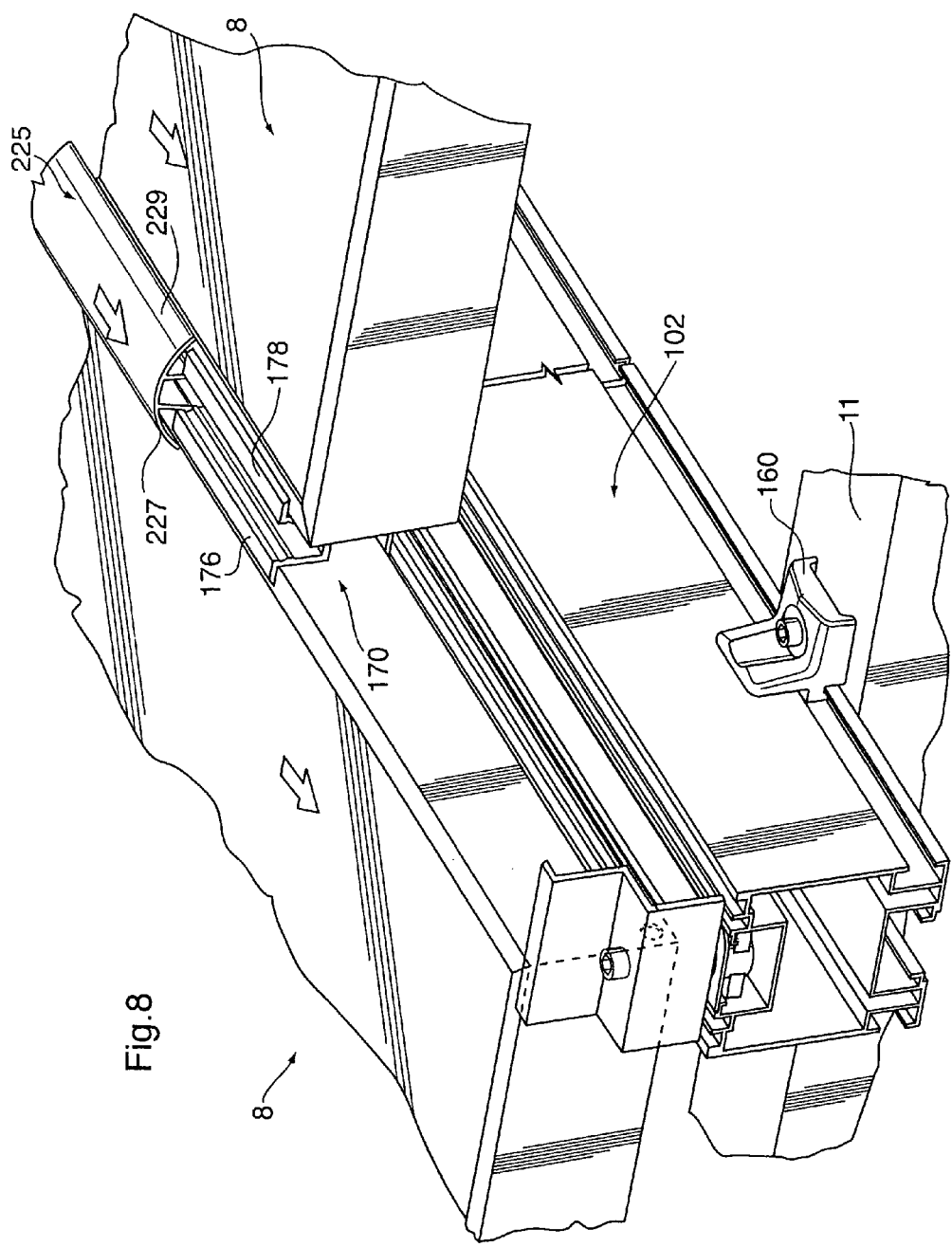
FIG. 8 is a partial assembly view of two panels being secured to a hollow support beam.
Figure 9:
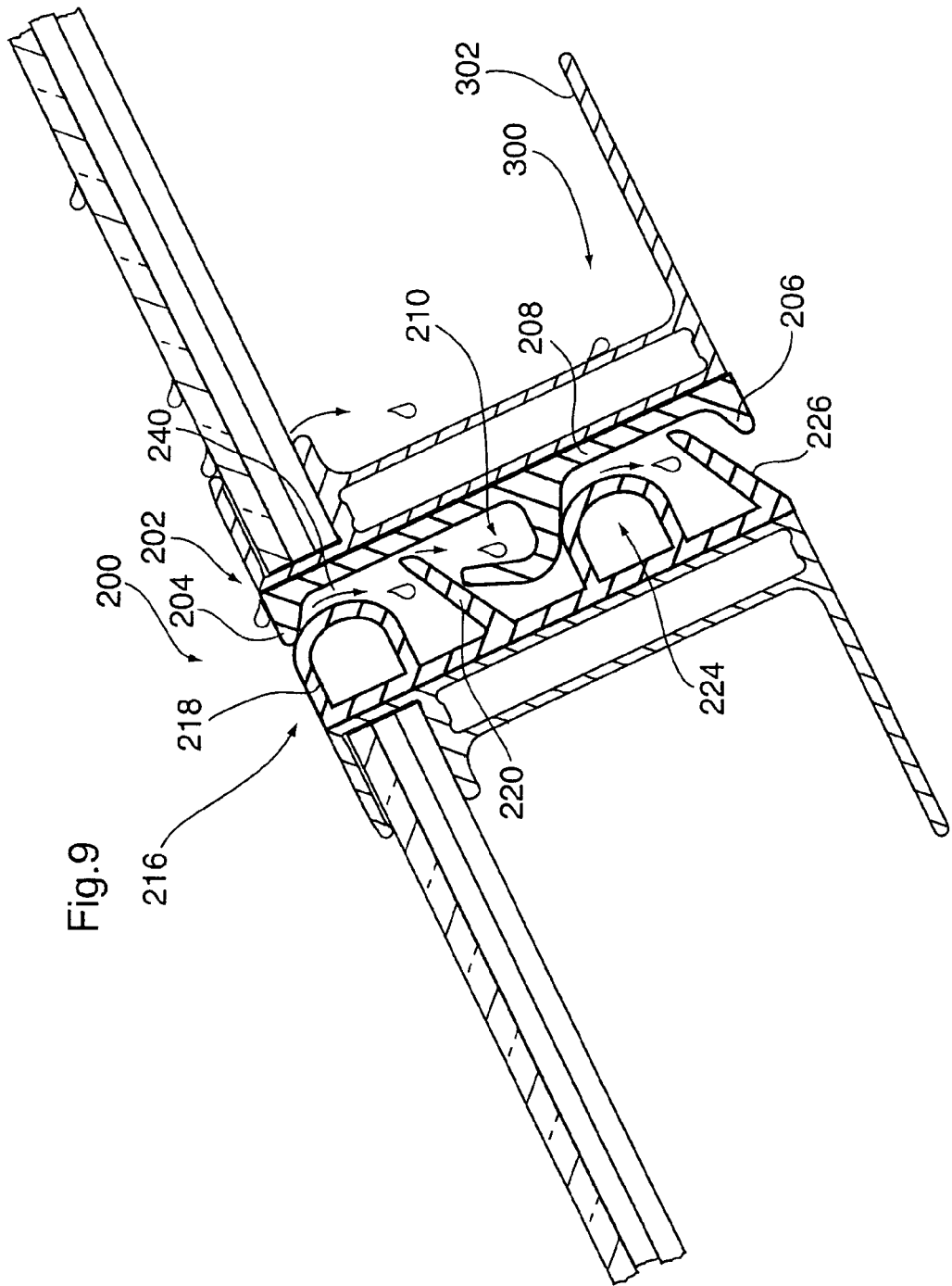
FIG. 9 is a partial cross-sectional view through two panels in abutting end to end relationship showing a preferred seal arrangement therebetween.
Figure 10:
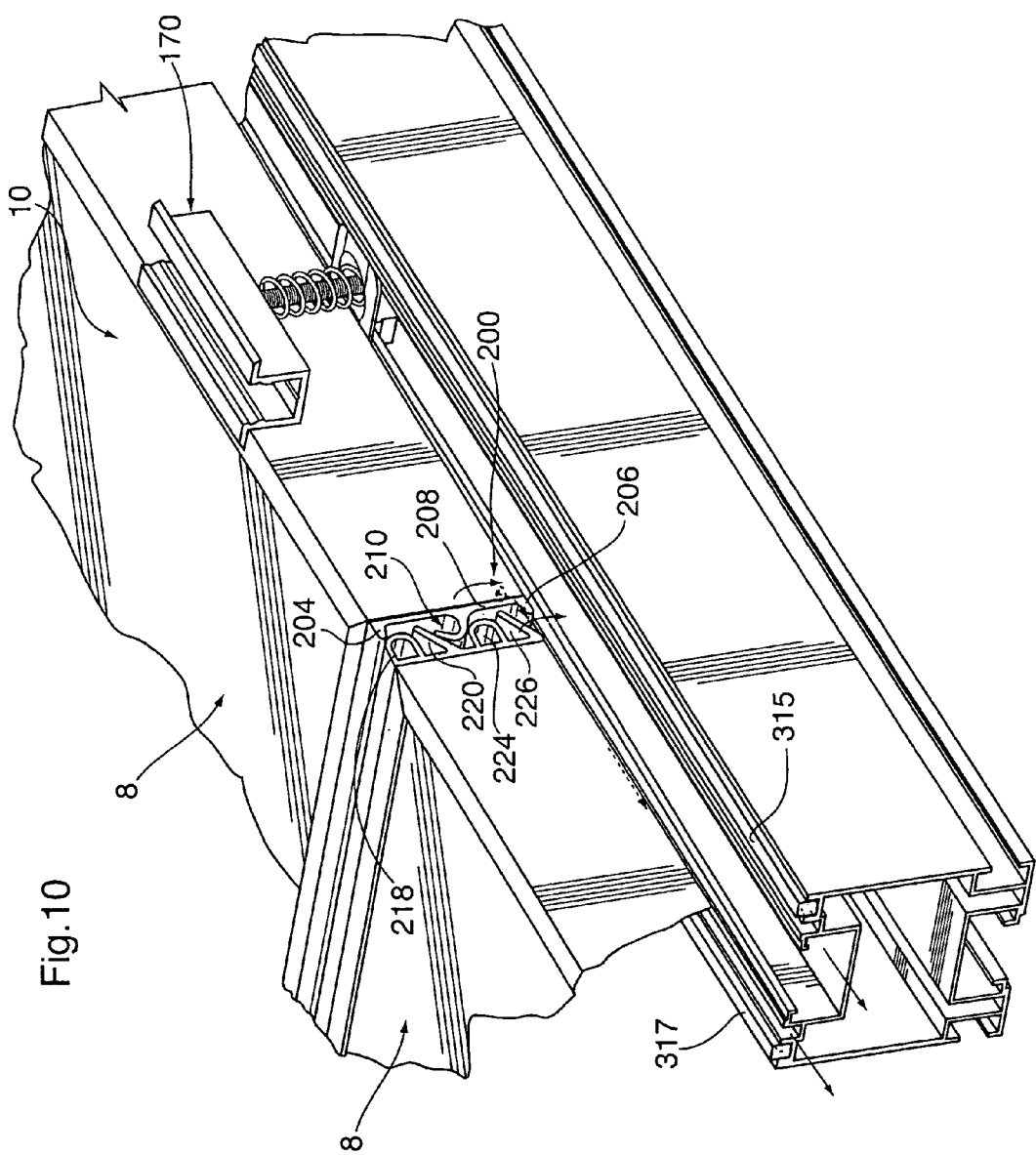
FIG. 10 is a partial perspective view showing two abutting panels supported above and mechanically fastened to a support beam.

The securement of the solar panels 8 to the underlying hollow support beams 6 can be appreciated from a review of FIGS. 8 and 10. The panels are secured in place using the two-way connectors 170. The connectors secure panels to opposite sides of adjacent hollow support beams 6. The panels of each elongate segment 10 are abutted in an end-to-end manner and a sealing arrangement 200 is positioned between abutting panels as shown in FIG. 10. The sealing arrangement 200 is best shown in FIG. 9.

As the solar panel roof surface is sloped, water such as rain strikes the roof and runs down the elongate segments 10. The water passes over the junction between abutting panels of an elongate segment and across the sealing arrangement 200. The sealing arrangement 200 provides a flow across water barrier between an upstream panel and a downstream panel. The seal arrangement 200 includes an upstream extruded or molded component 202 that extends generally the depth of the panel. This upstream component includes a projecting flange 204 at an upper surface and a lower projecting flange 206. These members are connected by the panel abutting elongate member 208. An inwardly and upwardly projecting U-shaped segment 210 is provided at a central portion of the panel abutting member 208.

The extruded or molded downstream component 216 includes the hollow bead 218 that cooperates and forms a seal with the projecting flange 204. The hollow bead portion is deformable and provides an effective seal with the projecting flange 204 of the upstream component.

The downstream component 216 below the hollow bead 218 includes an upwardly angled flange 220 that engages the panel abutting member 208 of the upstream component. The end of component 220 engages the upstream panel abutting member 208 and forms another seal. The inwardly extending U-shaped segment 210 is positioned to cooperate with the projecting flange 220 and forms a further seal. The downstream component 216 includes a further hollow bead 224 which engages the underside of the U-shaped segment 210 and forms a further seal therewith. Lastly the downstream component 216 includes a further upwardly and inwardly projecting flange 226 which engages the panel abutting member 208 of the upstream component 202.

As shown in FIG. 9, the primary seal provided between the projecting flange 204 and the hollow bead 218 will assure that water passes off the upstream solar panel and on to the downstream solar panel of an elongate segment of solar panels. Although it is anticipated this upper seal will be sufficient, it is understood that water is difficult to control and some water on occasion may pass through this upper seal as shown by arrow 240 in FIG. 9. This water will then be trapped or stopped by the inwardly and upwardly projecting flange 220 that cooperates with the panel abutting member 208. If this second seal is not sufficient then the U-shaped segment 210 of the upstream component 202 will then contribute as a further seal. Lastly, if water passes around the U-shaped member and around the further hollow bead 224, the water will be retained above the flange 226. These various members cooperate to form channels which extend across the elongate segments of abutting panels and connect with the hollow support beams. As will be further described, this water can then be effectively discharged into the hollow support beams and will flow out the end of the hollow support members. The sealing arrangement 200 comprising the upstream component and the downstream component are made of resilient rubber type material and have proven effective in sealing abutting panels while responding to expansion and contraction of panels with substantial temperature variations. The seal arrangement also addresses issues with respect to possible leakage within the seal arrangement, and any water which does leak into the seal arrangement is effectively channeled and drained off the roof structure. This is a compressible seal arrangement, and thus it simplifies the installation of panels and also allows for efficient installation thereof.

As shown in the partial perspective view of FIG. 10, the seal arrangement 200 extends to the central securing slot and any water that finds its way into the seal can pass out the ends of the seal arrangement and into the central securing slot. As this slot is continuous along the length of the hollow support beam 6, water will flow by gravity along the hollow support beams and exit the ends thereof.

Figure 11:
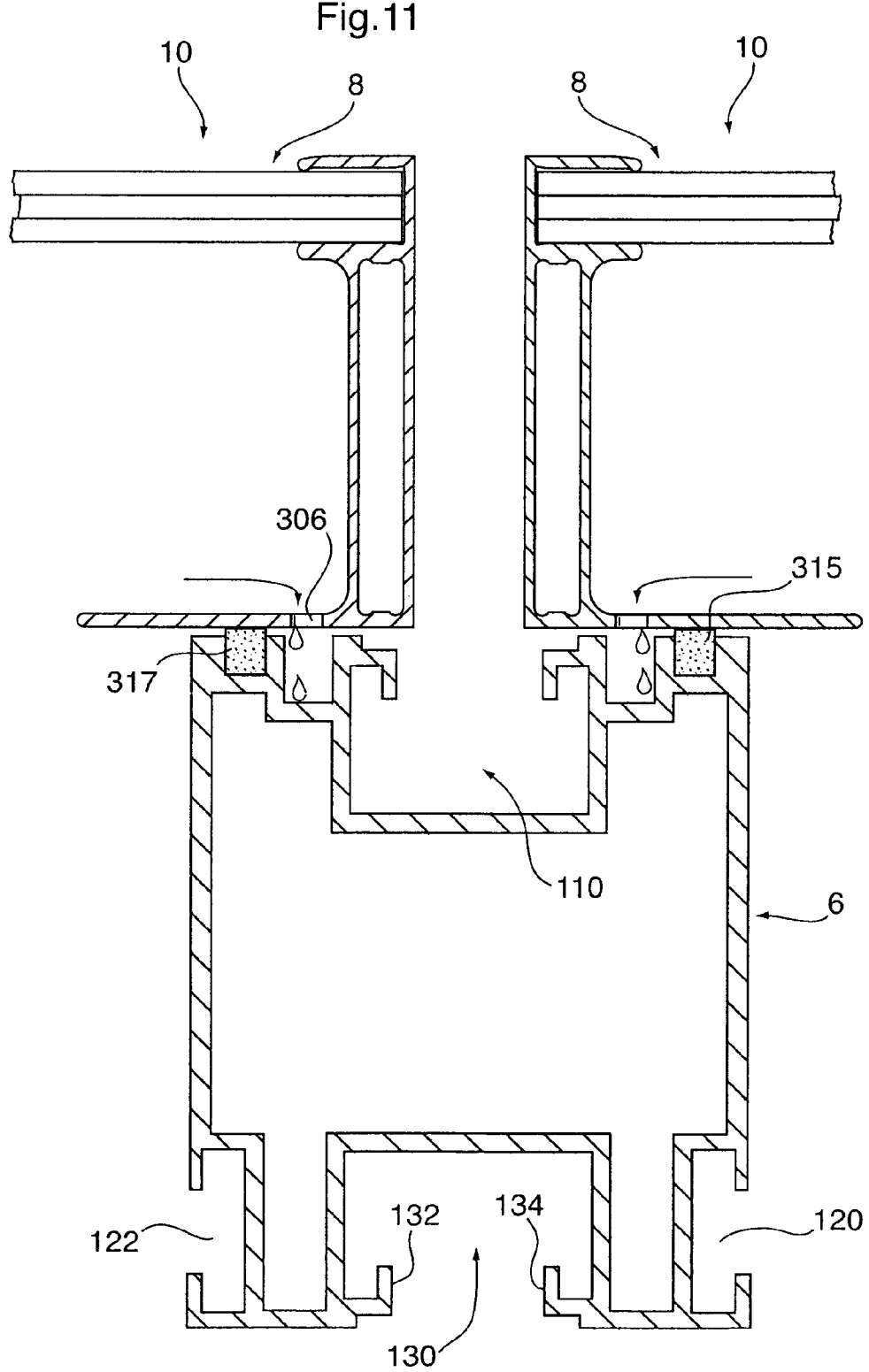
FIG. 11 is a sectional view through a support beam with two panels mounted thereabove illustrating the drainage of water or moisture collecting on the inside edge of a panel through a drain hole provided in a panel frame.
Figure 12:
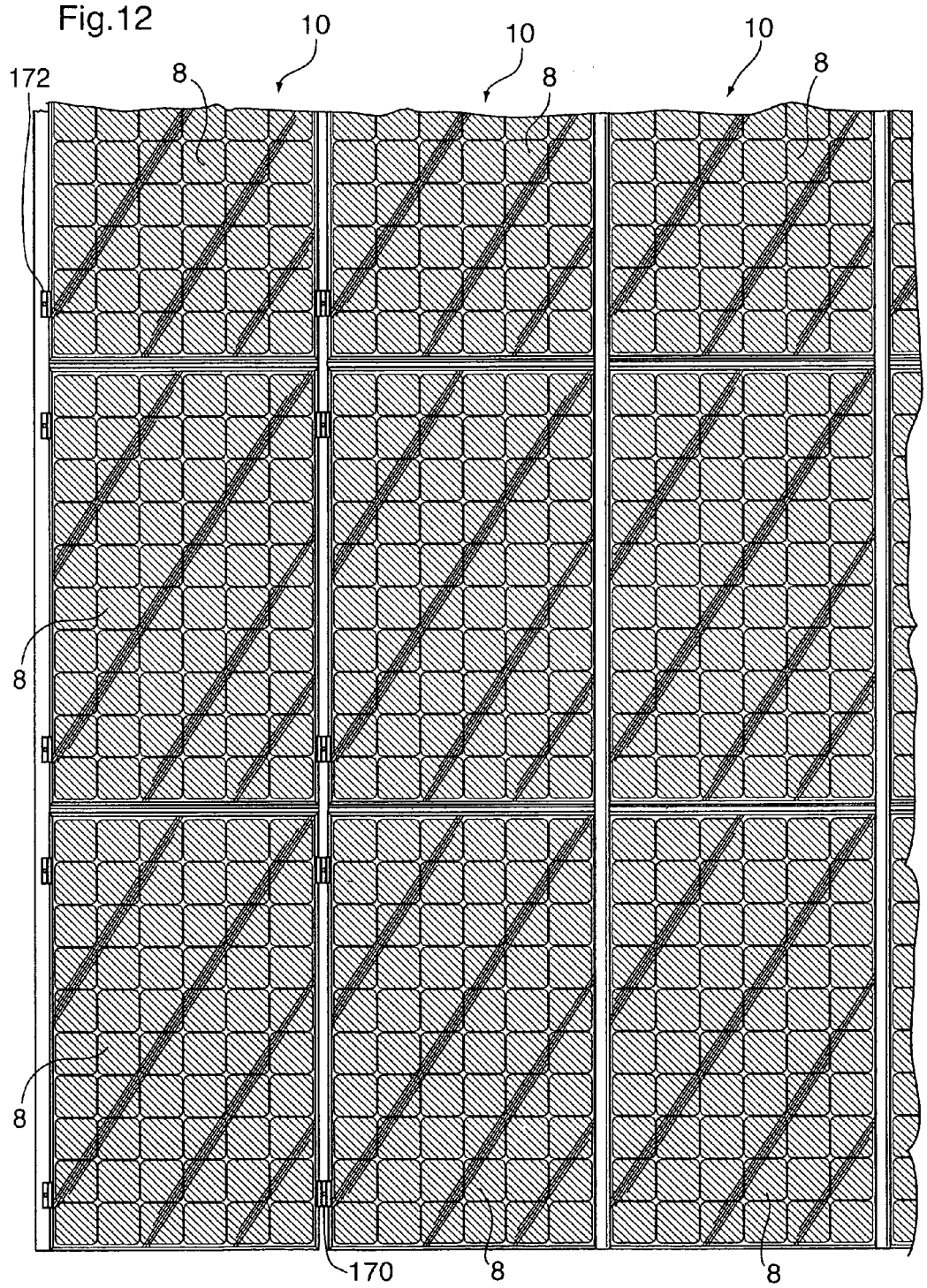
FIG. 12 is a partial top view showing a series of connected panels.

With the solar panel roof surface 2 it is possible, depending upon the particular application of the building, that condensation may accumulate on the lower surface of the solar panels and flow by gravity and capillary action to the edge of the solar panels. The edge of the solar panels includes a frame member 300 that includes an inwardly directing flange 302. The panels all include an inwardly directing flange 302 about the periphery thereof. Water that accumulates on the lower surface of the solar panels will flow by gravity to the lower panel edge and strike the frame member 300. The water will flow down the face of the frame member 300 and initially accumulate on the inwardly directed flange. The accumulated water will then flow along the inwardly directing flange 302 and pass out one of the drain ports 306 to the hollow support beams as shown in FIG. 11. Basically the inwardly directing flange 302 at the corners of the panels include a drain port 306 which is positioned for placement above the drain channels 142 or 144 provided in the top surface 100 of the hollow support beam 6. Thus any condensation that accumulates on the lower surface of the panels is directed outwardly to the hollow support beam 6 and will flow along the support beams 6 and out the roof edge ends thereof.

The sectional view of FIG. 11 also shows the gasket members 315 and 317 that are received in the sealing channels 140 and 146 of the top surface 100. With this arrangement, the gasket members 315 and 317 effectively seal the solar panels to the lower support hollow beams 6 while allowing water that may accumulate on the inside of the panels to pass into the hollow support beams 6.

As shown in FIGS. 10 and 11 the elongate segments 10 of the abutting solar panels are spaced from one another to define a gap between elongate segments 10 generally centered above the central securing slot 110. This gap accommodates various connectors used to engage each of the panels and pull the solar panels down into engagement with the support beam 6.

Figure 7:
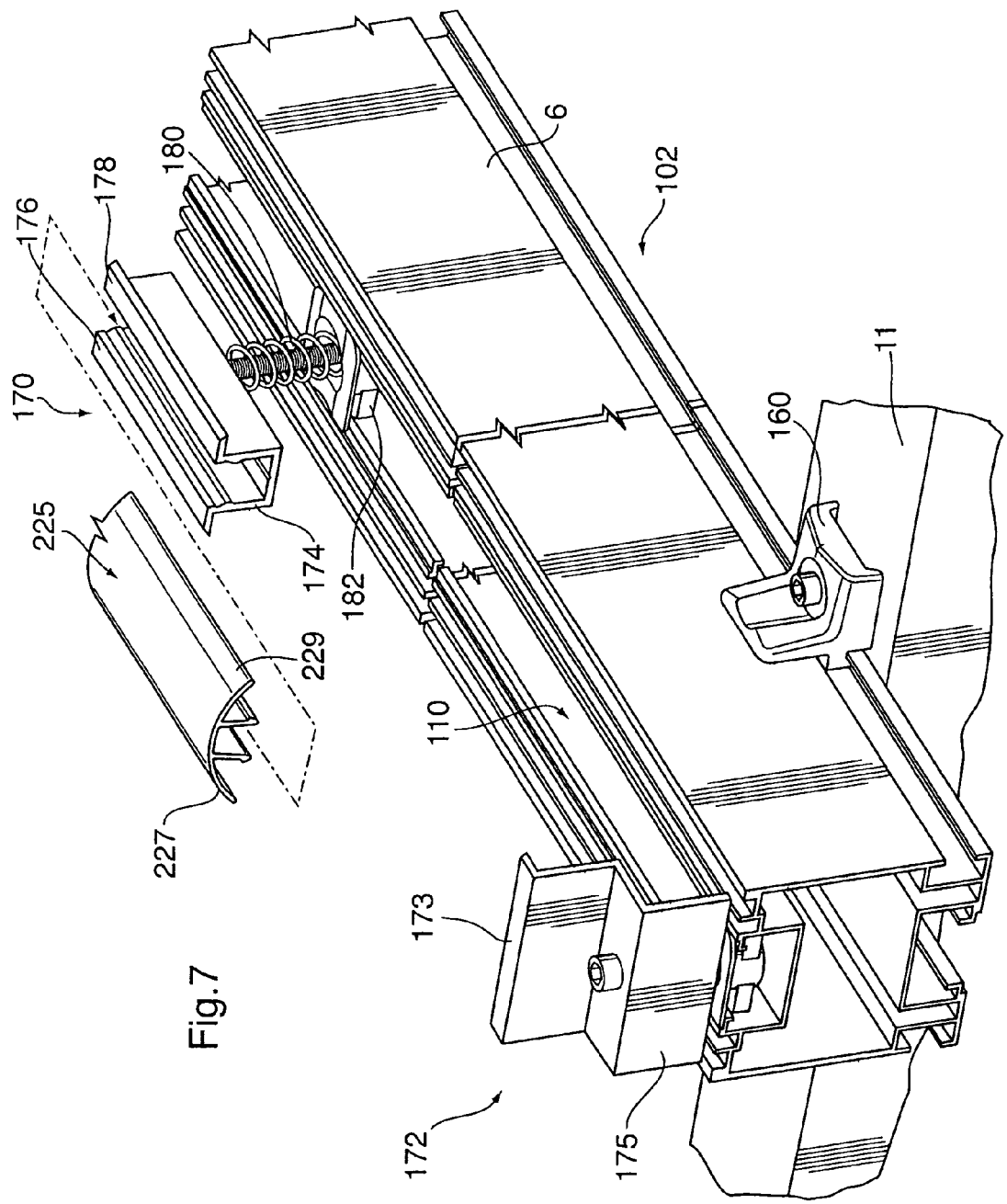
FIG. 7 is a partial perspective view of a hollow support beam mounted on an underlying support together with connectors and a filler cap (only a portion shown) used to close the top of the hollow support beam.

As shown in FIG. 7, an extruded cap member 225 is received within the U-shaped portion 174 and is held therein by friction fit. This cap portion 110 includes outwardly directing directed flanges 227 and 229 that engage each of the respective elongate segments of solar panels. This cap member is preferably pressed into and retained in the channel 174. The cap member 225 directs water away from the securing channel 110, however some water will pass underneath the cap and into the securing channel. This water will then drain by gravity out the end of the securing channel and off the roof system.

The described solar panels include a number of distinctive features. As shown in FIG. 4, the solar panels 8 include an outer frame 300 about the periphery thereof. This outer frame 300 includes an upper portion 320 for capturing the functional layers or elements of the solar panel. These functional elements include an upper surface 322 (typically a tempered glass), a first EVA layer 323, a working layer of photovoltaic cells 324, a second EVA layer 325 and a bottom layer 326 preferably a TEDLAR™ film. Basically light radiation passes through the top layer 322 and the first EVA layer 323 and is absorbed by the photovoltaic cell layer 324. In known solar panels the bottom layer 326 includes light reflecting properties whereby light that actually passes through the photovoltaic cells 324 is reflected back to this layer for higher power conversion. In a preferred aspect of the present solar panels any light that does pass through the photovoltaic layer 324 is allowed to pass through the second EVA layer and the TEDLAR™ layer and out of the panels. Basically the photovoltaic cells 324 as shown in FIG. 3 are a grid network and there are small areas identified as 331 where light can pass through the panels. This collective area 331 corresponds to approximately 3-5% of the surface area of the panel or the panels generally allow about 5% transmission of available light through the panels.

It has been found that allowing a small portion of the light radiation to pass through the solar panels is of assistance in providing lighting for the interior of the building beneath the roof structure. Re-directing of the light back to the photovoltaic cells is not particularly effective, and it is preferred to allow a portion of the light to pass through between cells and provide ambient type lighting. In this way the lower surface of the solar panels includes a transparent layer rather than a radiation reflecting layer as would be common in the prior art. This allows a transmission of a small portion of the radiation received by the roof structure. This ability to transmit some light has been found particularly suitable for riding stables, livestock barns and other structures where some lighting within the confines of the building is desirable. In addition transmitting this light has been found to reduce the operating temperature of the panels and marginally increase the output.

In a preferred embodiment the tempered glass layer of the panel is about 3.2 mm thick, the first EVA layer is 0.4 mm thick, the photovoltaic cells are about 2 mm thick, the second EVA layer is 0.4 mm thick and the bottom layer is 0.5 mm thick.

The periphery of the layers within the outer frame 300 includes caulking 328 and a further bead of caulking 330 is provided adjacent the support flange 332. The frame 300 includes a double walled section 334 about the periphery thereof and a large inwardly extending support flange 336.

The actual solar panels supported between adjacent hollow support beams 6 are quite strong and will support the weight of a worker on the roof structure. The frame provides additional distribution of the force to the lower support members and there is no appreciable danger of falling through the roof structure. Care should be exercised as excessive deflection of the solar panels, for example by jumping on the center thereof, may cause damage to the photovoltaic cells and in particular to the electrical connection between such cells.

It has been found that the present system reduces the time and labour required to install a solar panel roof surface that provides a closed roof. The transmission of rain and other moisture off the roof structure is a combination of this moisture running over the abutting panels and some moisture will be directed to the drain channels provided in the top surface of the hollow support members. The downward angling of these hollow support members assures effective transmission by gravity of any redirected moisture out the ends of the hollow support members and off the roof structure.

By providing a solar panel system in combination with an effective roof system, the total cost of the installation is reduced and the payback for such a system is reduced.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A solar panel roof surface comprising
    a roof support substructure having a series of parallel hollow support beams extending downwardly from a roof peak to a roof edge;
    a series of solar panels secured to and cooperating with said series of parallel hollow support beams to collectively define a closed sloped roof surface;
    said series of solar panels being positioned and supported to define elongate segments of abutting panels where each elongate segment includes a plurality of abutting panels with said elongate segment being one panel wide and supported by adjacent hollow support beams; and wherein said abutting panels include a water resistant sealing arrangement between panels whereby water on said panels flows along the length of said elongate segments and across abutting panels to said roof edge; and wherein
    said series of hollow support beams include a top surface including a central upwardly opening securing slot positioned between said elongate segments and panel segment support surfaces on said top surface either side of said securing slot supporting edges of said solar panels and at least one drainage channel in said top surface and extending the length of the support beam for draining of water received in said channel to said roof edge; and
    a series of fasteners received in said upwardly opening securing slot that engage said slot and cooperate with an upper flanged member to draw said upper flanged member downward pressing said panels against said top surface of said elongate support beams with sufficient pressure to secure said panels to said support beams.

2. A solar panel roof surface as claimed in claim 1 wherein said top surface of each hollow support beam includes two shallow elongate drainage channels positioned either side of said securing slot with each drainage channel being located beneath an edge of the panels forming the elongate segment supported by the respective hollow support beam.

3. A solar panel roof surface as claimed in claim 2 wherein each drainage channel is of a depth less than half the depth of said central securing slot.

4. A solar panel roof surface as claimed in claim 3 wherein each hollow support beam includes two elongate gasket receiving slots parallel to and either side of said central receiving slot and located between said two shallow elongate drainage channels;
    and wherein each elongate gasket receiving slot includes a gasket that engages and forms a seal with the panels supported by the respective hollow support beam.

5. A solar panel roof surface as claimed in claim 2 wherein each panel includes a frame having an inwardly directed lower flange that engages and forms said seal with the respective gasket with each lower flange overlapping with one of said drainage channels and extending partially into said securing channels of said respective hollow support beams.

6. A solar panel roof surface as claimed in claim 5 wherein each panel frame and the lower flanges thereof define an inwardly extending bottom peripheral flange and drain holes are provided in said bottom peripheral flange adjacent corners of said panels; and wherein said drainage holes are located above said drainage channels.

7. A solar panel roof surface as claimed in claim 6 providing a roof structure above an interior space of a building wherein said solar panels each include a light transmitting bottom surface and said panels allow transmission of approximately 5% of available light through said panels to illuminate said interior space of said building.

* * * * *

UNITED STATES PATENT AND TRADEMARK OFFICE
CERTIFICATE OF CORRECTION

| | |
|---|---|
| PATENT NO. | : 8,266,846 B2 |
| APPLICATION NO. | : 12/662873 |
| DATED | : September 18, 2012 |
| INVENTOR(S) | : George Schoell |

It is certified that error appears in the above-identified patent and that said Letters Patent is hereby corrected as shown below:

Name of Assignee should read: 2192780 Ontario Inc. (o/a Galaxy Energy Americas)

Signed and Sealed this
Eighteenth Day of December, 2012

David J. Kappos
*Director of the United States Patent and Trademark Office*

UNITED STATES PATENT AND TRADEMARK OFFICE
CERTIFICATE OF CORRECTION

PATENT NO. : 8,266,846 B2  Page 1 of 1
APPLICATION NO. : 12/662873
DATED : September 18, 2012
INVENTOR(S) : George Schoell It is certified that error appears in the above-identified patent and that said Letters Patent is hereby corrected as shown below:

Title Page, Item (73), Assignee should read:
-- 2192780 Ontario Inc. (o/a Galaxy Energy Americas) --.

This certificate supersedes the Certificate of Correction issued December 18, 2012.

Signed and Sealed this
Nineteenth Day of February, 2013

Teresa Stanek Rea
*Acting Director of the United States Patent and Trademark Office*